(12) United States Patent
Mednik

(10) Patent No.: US 9,474,118 B2
(45) Date of Patent: Oct. 18, 2016

(54) CASCODE-TYPE DIMMING SWITCH USING A BIPOLAR JUNCTION TRANSISTOR FOR DRIVING A STRING OF LIGHT EMITTING DIODES

(71) Applicant: Microchip Technology Inc., Chandler, AZ (US)

(72) Inventor: Alexander Mednik, Campbell, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 14/549,433

(22) Filed: Nov. 20, 2014

(65) Prior Publication Data

US 2015/0145425 A1    May 28, 2015

Related U.S. Application Data

(60) Provisional application No. 61/907,819, filed on Nov. 22, 2013.

(51) Int. Cl.
*H05B 33/08* (2006.01)

(52) U.S. Cl.
CPC ...... *H05B 33/0845* (2013.01); *H05B 33/0815* (2013.01); *H05B 33/0818* (2013.01)

(58) Field of Classification Search
CPC .......... H05B 33/0815; H05B 33/0818; H05B 37/029; H05B 37/02; H05B 41/3925; H05B 41/391; H05B 41/2828; H05B 33/0803
USPC .... 315/193, 185 R, 186, 122, 210, 250, 307
See application file for complete search history.

(56) References Cited

U.S. PATENT DOCUMENTS

| | | | |
|---|---|---|---|
| 5,966,110 A | 10/1999 | Van Zalinge | |
| 6,049,234 A * | 4/2000 | Miyashita | H04M 11/002 327/24 |
| 7,740,371 B1 * | 6/2010 | Lebens | F21L 4/027 315/127 |
| 9,131,569 B2 * | 9/2015 | van de Ven | H05B 33/0818 |
| 2008/0143266 A1 * | 6/2008 | Langer | H05B 33/0818 315/185 R |
| 2011/0169475 A1 * | 7/2011 | Koyasu | G05F 3/267 323/311 |
| 2011/0273102 A1 * | 11/2011 | van de Ven | H05B 33/0809 315/193 |
| 2012/0326613 A1 * | 12/2012 | Liu | G09G 3/342 315/185 R |
| 2013/0147359 A1 * | 6/2013 | Chobot | H05B 33/0857 315/122 |
| 2014/0015429 A1 * | 1/2014 | Luo | H05B 37/02 315/193 |

FOREIGN PATENT DOCUMENTS

CN    102791062 A1    11/2012

OTHER PUBLICATIONS

PCT Search Report mailed on Mar. 12, 2015 corresponding to the related PCT Patent Application No. US2014/066936.

* cited by examiner

*Primary Examiner* — Douglas W Owens
*Assistant Examiner* — Syed M Kaiser
(74) *Attorney, Agent, or Firm* — DLA Piper LLP (US)

(57) ABSTRACT

The invention comprises a dimming switch for use with a string of light emitting diodes (LEDs). The dimming switch comprises a bipolar junction transistor (BJT) driven in a cascode scheme. The dimming switch also comprises circuitry to offset the current that drives the base of the BJT to provide a controlled amount of current to the LEDs when the dimming input signal is high.

20 Claims, 2 Drawing Sheets

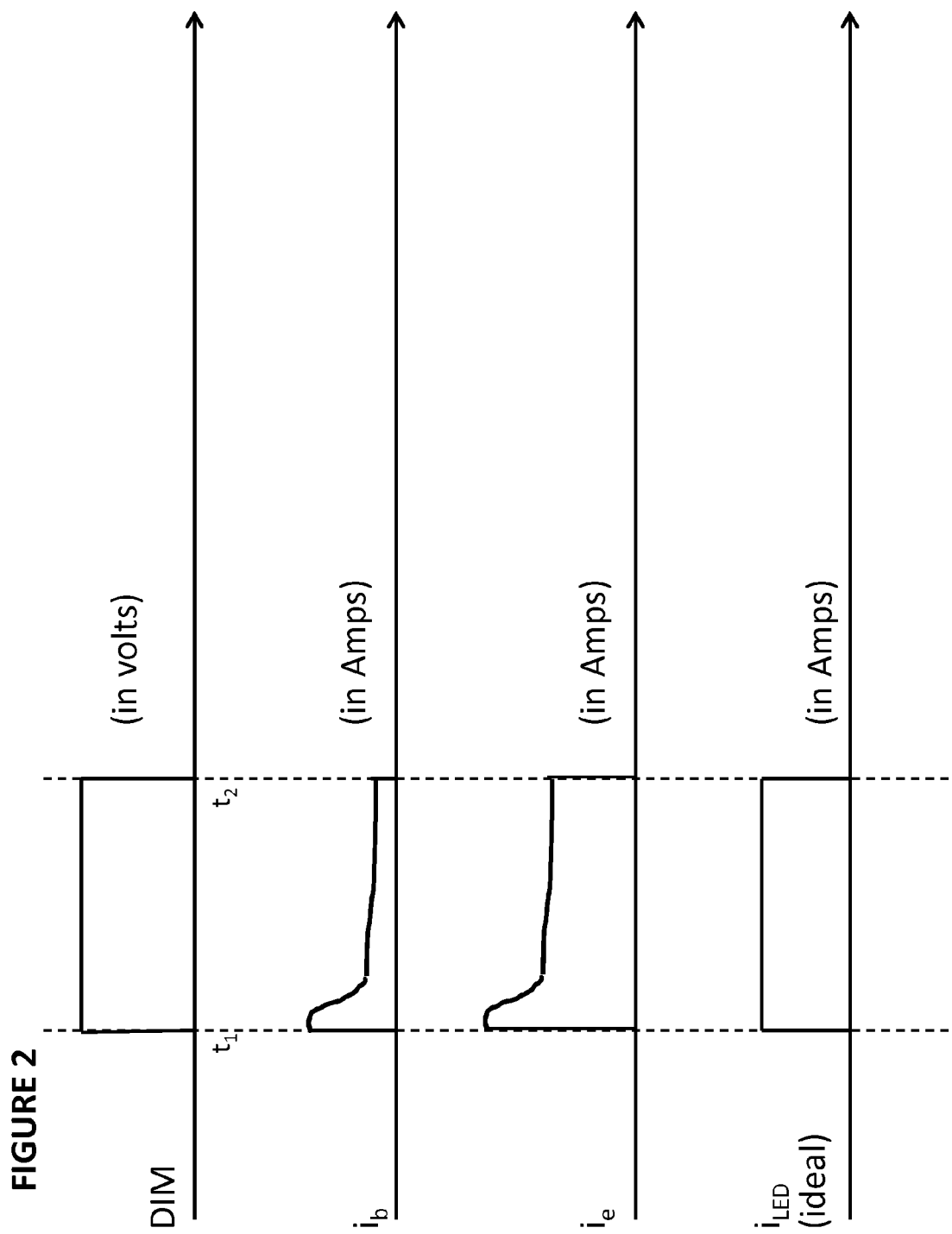

CASCODE-TYPE DIMMING SWITCH USING A BIPOLAR JUNCTION TRANSISTOR FOR DRIVING A STRING OF LIGHT EMITTING DIODES

CROSS REFERENCE TO RELATED APPLICATION

This application claims priority from U.S. Provisional Application No. 61/907,819, filed on Nov. 22, 2013, and titled "Cascode-Type Dimming Switch Using BJT," which is incorporated herein by reference in its entirety.

TECHNICAL FIELD

The invention comprises a dimming switch for use with a string of light emitting diodes (LEDs). The dimming switch comprises a bipolar junction transistor (BJT). The dimming switch also comprises control circuitry to offset the current that drives the base of the BJT to provide a controlled amount of current to the LEDs when the dimming input signal is high. The invention is useful for numerous applications, including LCD panel backlighting.

BACKGROUND OF THE INVENTION

The prior art includes some solutions for dimming switches for LEDs. These solutions typically utilize field effect transistors (FETs) to control the current driven through the LEDs. BJTs have not been used in this context because of two drawbacks. First, BJTs have a slow switching speed compared to FETs. Second, because the current through the base of a BJT is added to the current through the emitter of the BJT, the current through the LEDs (which would be connected to the collector of the BJT) cannot be properly sensed and controlled. However, high-voltage BJTs are cheaper and easier to manufacture than FETs, and the overall cost of a dimming switch could be improved by using BJTs instead of FETs.

A dimming switch for LEDs that utilizes a FET and BJT in a cascode configuration can combine the benefits of the fast switching speed of an FET and the low cost of a BJT. However, the source current of the low-voltage FET in a cascode configuration will not be an accurate representation of the current through the LEDs connected to the BJT collector, as the source current of the FET will be offset by base current of the high-voltage BJT. Therefore, a current sense resistor placed in series with the FET source will produce an erroneous sense voltage. What is needed is control circuitry for driving a BJT-FET cascode while negating the effect of the BJT base current in the current sense resistor.

SUMMARY OF THE INVENTION

The invention comprises a dimming switch for use with a string of LEDs. The dimming switch comprises a BJT and FET in a cascode configuration. The dimming switch also comprises circuitry to offset the current that drives the base of the BJT to provide a controlled amount of current to the LEDs when the dimming input signal is high.

BRIEF DESCRIPTION OF THE DRAWINGS

FIG. 2 depicts certain current characteristics of different nodes within the embodiment of FIG. 1.

DETAILED DESCRIPTION OF THE PREFERRED EMBODIMENT

Figure 1:
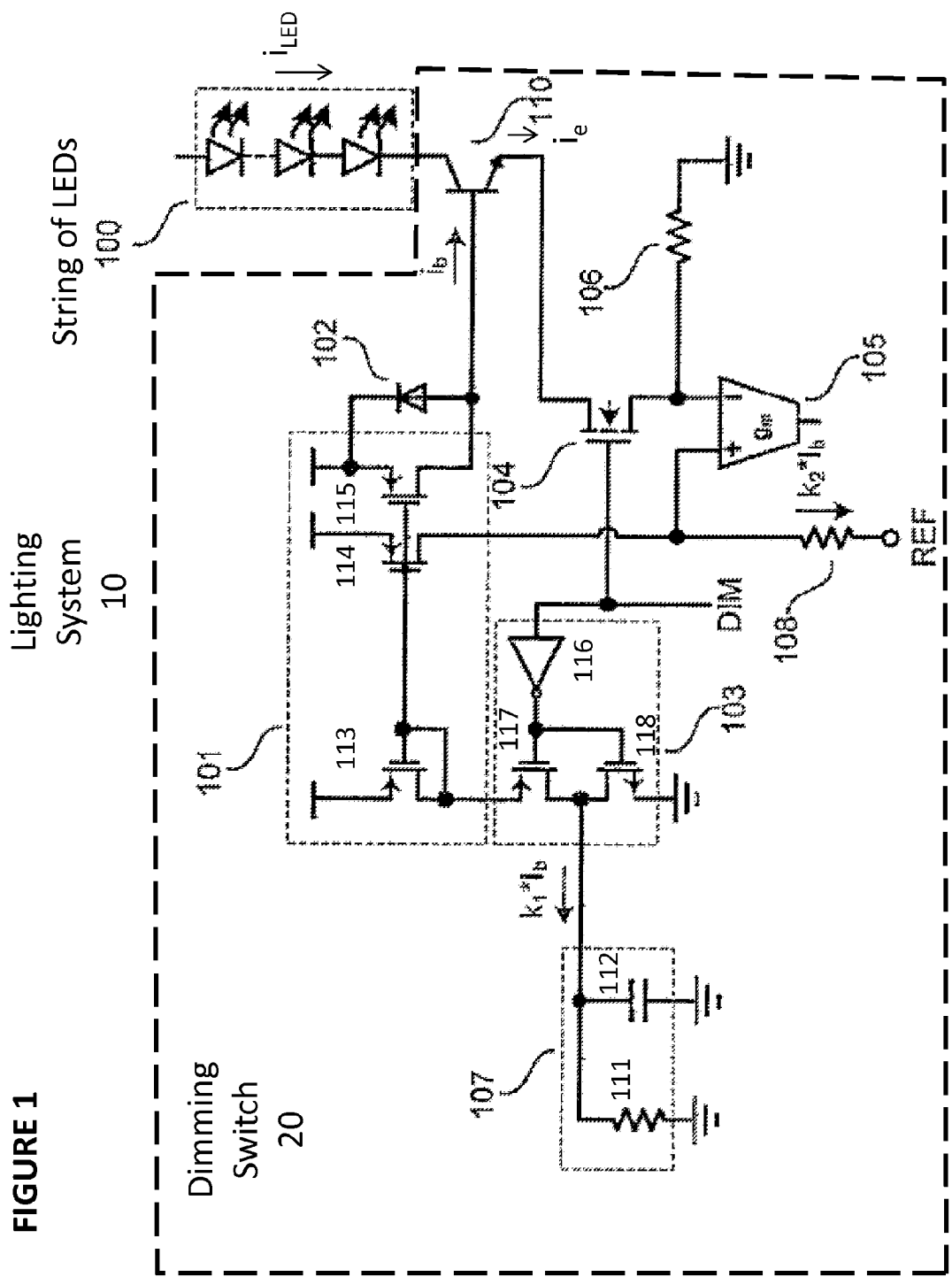
FIG. 1 depicts an embodiment of a dimming switch for LEDs.

FIG. 1 depicts lighting system 10 comprising string of LEDs 100 and dimming switch 20. Dimming switch 20 in this example is a pulse width modulation (PWM) dimming switch.

Dimming switch 20 comprises FET 104 acting as an emitter driver switch controlled by an input dimming signal DIM (which is a PWM signal) and a high-voltage BJT 110. Dimming switch 20 is connected in series with string of LEDs 100. The current magnitude through string of LEDs 100 is controlled by a current feedback amplifier 105 receiving a current sense signal from a resistor 106 and regulating the current sense signal to a reference voltage REF.

Base current $i_b$ is supplied to BJT 110 by a current mirror circuit 101 in proportion with a reference current $k_1 * i_b$ programmed by a current reference network such as resistor-capacitor (RC) network 107. Control switch 103 enables the reference current $k_1 * i_b$ when the dimming signal DIM is received. In this example, control switch 103 comprises inverter 116, transistor 117, and transistor 118 in the configuration shown in FIG. 1. One of ordinary skill in the art will appreciate that other types of logic gates can be used instead of inverter 116.

A second proportional current $k_2 * i_b$ generated by current mirror circuit 101 offsets the reference voltage REF to cancel the effect of the base current $i_b$ in the current $i_{LED}$ through string of LEDs 100. The offset of the reference voltage REF is generated at a resistor 108 by passing the current $k_2 * i_b$ through resistor 108.

A diode 102 facilitates fast turn off of the BJT 110.

Dimming switch 20 shown in FIG. 1 can be characterized as a means for driving current through a string of LEDs 100 in response to a dimming input signal.

Operation of lighting system 10 will now be described with reference to FIGS. 1 and 2. In FIG. 2, an exemplary pulse of the input signal DIM is depicted. In lighting system 10, dimming is achieved through the pulse width modulation input signal DIM. Lower light will be emitted from string of LEDs 100 if the width of the pulses of input signal DIM is reduced, or if the frequency of the pulses within input signal DIM is reduced.

When input signal DIM is low, the output of inverter 116 is high. As a result, transistor 117 is turned off, and transistor 118 is turned on. Any charge stored on capacitor 112 is removed through resistor 111 and through transistor 118 to ground. FET 104 is turned off, and no current flows through the emitter of BJT 110. Any residual current in LED string 100 flows through the base of BJT 110 and through diode 102.

When input signal DIM goes high, such as at time $t_1$, the output of inverter 116 goes low. As a result, transistor 117 is turned on, and transistor 118 is turned off. FET 104 is turned on, and current $i_e$ is drawn through the emitter of BJT 110. Current $k_1 * i_b$ is drawn through transistors 113 and 117 and charges capacitor 112. As shown in FIG. 2, the current $i_b$ initially spikes as the capacitor begins to charge and eventually plateaus once the capacitor is charged and the current $k_1 * i_b$ flows through resistor 111. Current mirror 101 generates current $k_2 * i_b$ through resistor 108 and current $i_b$ into the base of BJT 110. Here, $k_1$ and $k_2$ are based on the relative matching characteristics of transistors 113, 114, and 115.

Arbitrary values for $k_1$ and $k_2$ can be selected. Ideally, $k_1$ and $k_2 \gg 1$ to achieve low current consumption. In this embodiment, cancellation of the base current $i_b$ assumes that $R_{106} = k_2 * R_{108}$.

In BJT 110, the current $i_e$ through the emitter will equal the sum of $i_{LED}$ through string of LEDs 100 (which is the current through the collector of BJT 110) and $i_b$ (which is the current through the base of BJT 110). As shown in FIG. 2, the magnitude of $i_{LED}$ ideally will be unaffected by the base current $i_b$ and will have a fast response to the input signal DIM. Current feedback amplifier 105 adds the offset of $k_2 * i_b * R_{108}$ into the reference REF path, and the turn-on process is accelerated by capacitor 112 and the turn-off process is accelerated by diode 102 and the cascode connection of FET 104 and BJT 110.

Current feedback amplifier 105 will seek to maintain a voltage of $REF + k_2 * i_b * R_{108}$ at the inverting node, which will develop at resistor 106. The current through resistor 106 therefore will be $i_e = (REF + k_2 * i_b * R_{108})/R_{106} = (REF/R_{106}) + i_b$. Hence the LED current $iLED = i_e - i_b = REF/R_{106}$, is unaffected by the base current $i_b$. The current through the emitter, $i_e$, is also shown in FIG. 2. As can be seen, dimming switch 20 corrects for the current $i_b$ that flows into the base of BJT 110.

Thus, the embodiment comprises a dimming switch using a cascode connection of a BJT 110 and a source driver MOSFET 104 where the current through the string of LEDs 100 is not affected by the current driving the base of the BJT.

What is claimed is:

1. A dimming switch for use with a string of light emitting diodes, comprising:
    a bipolar junction transistor and a field effect transistor coupled in a cascode configuration, the gate of the field effect transistor receiving a dimming input signal and the collector of the bipolar junction transistor capable of driving the string of light emitting diodes; and
    a control circuit coupled to the bipolar junction transistor and the field effect transistor, wherein the current through the collector is unaffected by the current through the base of the bipolar junction transistor, the control circuit comprising a control switch for receiving the dimming input signal and a current mirror for providing current to the base of the bipolar junction transistor in proportion to a current programmed by a current reference network coupled to the control switch.

2. The switch of claim 1, wherein the control circuit further comprises: a current feedback amplifier comprising an inverting input and a non-inverting input, the non-inverting input connected to the current mirror and one end of a reference resistor and the inverting input connected to the drain of the emitter driver switch and to a sense resistor and another end of the reference resistor connected to a reference voltage, wherein the current feedback amplifier regulates a voltage at the inverting input equal to the reference voltage when the dimming input signal is high.

3. The dimming switch of claim 1, wherein the dimming input signal is a pulse width modulation signal.

4. A dimming switch for use with a string of light emitting diodes, comprising:
    a bipolar junction transistor and a field effect transistor coupled in a cascode configuration, the gate of the field effect transistor receiving a dimming input signal and the collector of the bipolar junction transistor capable of driving the string of light emitting diodes;
    a control circuit coupled to the bipolar junction transistor and the field effect transistor, wherein the current through the collector is unaffected by the current through the base of the bipolar junction transistor; and
    a current mirror connected to the base of the bipolar junction transistor;
    wherein the control circuit comprises a current feedback amplifier comprising an inverting input and a non-inverting input, the non-inverting input connected to the current mirror and one end of a reference resistor and the inverting input connected to the drain of the emitter driver switch and to a sense resistor and another end of the reference resistor connected to a reference voltage, wherein the current feedback amplifier regulates a voltage at the inverting input equal to the reference voltage when the dimming input signal is high; and
    wherein the control circuit further comprises a control switch for receiving the dimming input signal and for connecting the current mirror to a current reference network, wherein the current reference network draws a current from the current mirror, and the current mirror provides a proportional current to the reference resistor and a proportional current to the base; and wherein the current through the collector is a function of the reference voltage and sense resistor when the dimming input signal is high.

5. The dimming switch of claim 4, wherein the current mirror comprises:
    three field effect transistors, each comprising a source, a gate, and a drain,
    wherein a source of each of the three field effect transistors is coupled to a voltage source and a gate of each of the three field effect transistors is coupled together.

6. The dimming switch of claim 5, further comprising a diode comprising a first terminal and a second terminal, the first terminal connected to the base and the second terminal connected to the voltage source.

7. The dimming switch of claim 6, wherein the dimming input signal is a pulse width modulation signal.

8. The dimming switch of claim 4, wherein the control switch comprises:
    a logic gate for receiving the dimming input signal;
    a first transistor connected in series to a second transistor, the gate of the first transistor and the gate of the second transistor receiving an output of the inverter; and
    the first transistor connected to the current mirror and the second transistor connected to ground;
    wherein a node between the first transistor and the second transistor is connected to the current reference network.

9. The dimming switch of claim 4, wherein the current reference network comprises at least one resistor and at least one capacitor.

10. The dimming switch of claim 4, wherein the dimming input signal is a pulse width modulation signal.

11. A lighting system responsive to a dimming input signal, comprising:
    a bipolar junction transistor and a field effect transistor coupled in a cascode configuration, the gate of the field effect transistor receiving the dimming input signal;
    a string of light emitting diodes connected to the collector of the bipolar junction transistor; and
    a control circuit coupled to the bipolar junction transistor and the field effect transistor, wherein the current through the collector is unaffected by the current through the base of the bipolar junction transistor, the control circuit comprising a control switch for receiving the dimming input signal and a current mirror for providing current to the base of the bipolar junction transistor in proportion to a current programmed by a current reference network coupled to the control switch.

12. The system of claim 11, wherein the control circuit comprises: a current feedback amplifier comprising an inverting input and a non-inverting input, the non-inverting input connected to the current mirror and one end of a reference resistor and the inverting input connected to the drain of the emitter driver switch and to a sense resistor and another end of the reference resistor connected to a reference voltage, wherein the current feedback amplifier regulates a voltage at the inverting input equal to the reference voltage when the dimming input signal is high.

13. The system of claim 11, wherein the dimming input signal is a pulse width modulation signal.

14. A lighting system responsive to a dimming input signal, comprising:
a bipolar junction transistor and a field effect transistor coupled in a cascode configuration, the gate of the field effect transistor receiving the dimming input signal;
a string of light emitting diodes connected to the collector of the bipolar junction transistor;
a control circuit coupled to the bipolar junction transistor and the field effect transistor, wherein the current through the collector is unaffected by the current through the base of the bipolar junction transistor; and
a current mirror connected to the base of the bipolar junction transistor;
wherein the control circuit comprises a current feedback amplifier comprising an inverting input and a non-inverting input, the non-inverting input connected to the current mirror and one end of a reference resistor and the inverting input connected to the drain of the emitter driver switch and to a sense resistor and another end of the reference resistor connected to a reference voltage, wherein the current feedback amplifier regulates a voltage at the inverting input equal to the reference voltage when the dimming input signal is high; and wherein the control circuit further comprises a control switch for receiving the dimming input signal and for connecting the current mirror to a current reference network, wherein the current reference network draws a current from the current mirror, and the current mirror provides a proportional current to the reference resistor and a proportional current to the base; and wherein the current through the collector is a function of the reference voltage and sense resistor when the dimming input signal is high.

15. The system of claim 14, wherein the current mirror comprises:
three field effect transistors, each comprising a source, a gate, and a drain,
wherein a source of each of the three field effect transistors is coupled to a voltage source and a gate of each of the three field effect transistors is coupled together.

16. The system of claim 15, further comprising a diode comprising a first terminal and a second terminal, the first terminal connected to the base and the second terminal connected to the voltage source.

17. The system of claim 16, wherein the dimming input signal is a pulse width modulation signal.

18. The system of claim 14, wherein the control switch comprises:
a logic gate for receiving the dimming input signal;
a first transistor connected in series to a second transistor, the gate of the first transistor and the gate of the second transistor receiving an output of the inverter; and
the first transistor connected to the current mirror and the second transistor connected to ground;
wherein a node between the first transistor and the second transistor is connected to the current reference network.

19. The system of claim 14, wherein the current reference network comprises at least one resistor and at least one capacitor.

20. The system of claim 14, wherein the dimming input signal is a pulse width modulation signal.

* * * * *